United States Patent
Stearns et al.

(10) Patent No.: US 7,326,738 B2
(45) Date of Patent: Feb. 5, 2008

(54) COMPOSITION AND PROCESS FOR FORMING A FLEXIBLE POLYURETHANE FOAM SEALING DEVICE

(75) Inventors: Robert B. Stearns, Luna Pier, MI (US); John P. Erickson, Southgate, MI (US); Steven Hicks, Brownstown, MI (US); John Cook, Plymouth, MI (US); Raghuram Gummaraju, Novi, MI (US)

(73) Assignee: BASF Corporation, Florham Park, NJ (US)

( * ) Notice: Subject to any disclaimer, the term of this patent is extended or adjusted under 35 U.S.C. 154(b) by 266 days.

(21) Appl. No.: 10/901,725

(22) Filed: Jul. 29, 2004

(65) Prior Publication Data

US 2006/0025488 A1   Feb. 2, 2006

(51) Int. Cl.
*C08G 18/28* (2006.01)

(52) U.S. Cl. ............... 521/131; 521/134; 521/137; 521/170; 521/174; 521/176

(58) Field of Classification Search ............. 521/131, 521/134, 137, 170, 174, 176
See application file for complete search history.

(56) References Cited

U.S. PATENT DOCUMENTS

| | | |
|---|---|---|
| 4,782,099 A | 11/1988 | Dietrich et al. |
| 5,001,167 A | 3/1991 | Wiltz, Jr. et al. |
| 5,510,053 A | 4/1996 | Narayan et al. |
| 5,521,226 A | 5/1996 | Bleys |
| 5,530,034 A | 6/1996 | Narayan et al. |
| 5,532,285 A | 7/1996 | Narayan et al. |
| 5,532,403 A | 7/1996 | Narayan et al. |
| 5,539,009 A | 7/1996 | Narayan et al. |
| 5,539,010 A | 7/1996 | Narayan et al. |
| 5,665,288 A | 9/1997 | Narayan et al. |
| 5,672,635 A | 9/1997 | Narayan et al. |
| 5,674,920 A | 10/1997 | Obata et al. |
| 6,031,010 A | 2/2000 | Lin |
| 6,043,291 A * | 3/2000 | Takeyasu et al. ............ 521/131 |
| 6,103,851 A | 8/2000 | Roser et al. |
| 6,218,443 B1 | 4/2001 | Valoppi et al. |
| 6,497,782 B1 | 12/2002 | Platz et al. |
| 6,593,387 B2 | 7/2003 | Parfondry et al. |
| 6,626,439 B1 | 9/2003 | Forry et al. |
| 6,660,783 B2 | 12/2003 | Arlt et al. |
| 2003/0065102 A1 | 4/2003 | Jourdain et al. |

FOREIGN PATENT DOCUMENTS

| | | |
|---|---|---|
| EP | 0764689 B1 | 3/1997 |
| WO | WO 99/16808 | 4/1999 |

* cited by examiner

*Primary Examiner*—John M. Cooney, Jr.
(74) *Attorney, Agent, or Firm*—Fernando A. Borrego

(57) ABSTRACT

The subject invention provides a composition and a process for forming a flexible polyurethane foam sealing device having improved compression set properties at increased temperatures. The sealing device is formed without the use of chemical blowing agents. The composition includes an isocyanate component for reaction with a resin component comprising an isocyanate-reactive component having a functionality of least four and a hydroxyl number of less than 40, a graft dispersion, and a physical blowing agent. The most preferred physical blowing agent is HFC-245 fa or 1,1,1,3,3-pentafluoropropane.

17 Claims, No Drawings

COMPOSITION AND PROCESS FOR FORMING A FLEXIBLE POLYURETHANE FOAM SEALING DEVICE

BACKGROUND OF THE INVENTION

1. Field of the Invention

The subject invention generally relates to a composition and a process for forming a flexible polyurethane foam sealing device. Specifically, the polyurethane foam sealing device is capable of withstanding increased temperatures within high performance engines.

2. Description of Related Art

The related art discloses compositions for forming flexible polyurethane foam sealing devices, such as gaskets. These compositions generally include an isocyanate component and a resin component. Various attempts have been made to produce sealing devices that could withstand increased temperatures.

One such related art sealing device is disclosed in U.S. Pat. No. 5,510,053 to Narayan et al. The '053 patent discloses an isocyanate prepolymer composition for use in forming the sealing device. Additionally, the '053 patent discloses using a polyether polyol having a functionality of from 1 to 4, which may include graft polyols, and a blowing agent that is comprised only principally of water. The composition produces sealing devices that have a compression set for 50% deflection of 1.3% at 158° F. for 22 hours to 23.8% at 180° F. for 22 hours (See Examples 2-5). Based upon these results, the sealing devices formed in accordance with the '053 patent cannot produce a satisfactory sealing device at temperatures in the range of 240-250° F.

Another related art sealing device is disclosed in U.S. Pat. No. 6,103,851 to Roser et al. The '851 patent discloses sealing devices formed from an elastomer for use at high temperatures. The sealing device is formed from a resin component having a polyol with a functionality of 3 or greater reacted with an isocyanate. The composition forms a polyurethane elastomer and does not include either a physical blowing agent or a chemical blowing agent. The '851 patent does not disclose any improved compression set properties of the sealing device.

As the vehicle industry continues to refine the performance of the engine, the engines operate under higher temperatures than ever before. Therefore, the sealing devices must be improved to withstand such temperatures. It is believed that these higher temperatures result from the engines being smaller and more compact while also improving engine efficiency.

The related art is characterized by one or more inadequacies. Specifically, the related art polyurethane foam sealing devices do not have satisfactory compression set properties at increased temperatures. These gaskets do not rebound after being subjected to the increased temperatures. This could lead to gasket failure and leaking within the engine. Additionally, when the engines are serviced, the compressed sealing device must be replaced to prevent premature failure of the sealing device.

BRIEF SUMMARY OF THE INVENTION

The subject invention provides a composition and a process for forming a flexible polyurethane foam sealing device. The composition comprises an isocyanate component and a resin component substantially free of chemically reactive blowing agents. The resin component includes an isocyanate-reactive component having a functionality of at least four and a hydroxyl number of less than 40, a graft dispersion, and a physical blowing agent.

The composition of the subject invention forms the polyurethane foam sealing device having improved compression set properties that can withstand increased temperatures of today's high performance engines. Since the sealing devices have sufficient rebound at temperatures from 240° F. to °250 F., the sealing devices are not likely to fail as often as the related art sealing devices. Additionally, when the engines are serviced, the sealing device does not need to be replaced as often, thereby extending the useful life of the sealing device when formed according to the subject invention.

DETAILED DESCRIPTION OF THE INVENTION

The subject invention provides a composition for forming a flexible polyurethane foam sealing device. More specifically, the sealing device has improved compression set properties that allow the sealing device to be used in high performance engines. These high performance engines are being made more efficient and compact which results in increased operating temperatures. Without intending to be bound by theory, it is believed that these improved properties are a result of being blown free of chemical blowing agents. The lack of chemical blowing agents in combination with the following isocyanate and resin components improves the compression set properties. The compression set properties are important because the high performance engines are operated under increased temperature, which makes the related art sealing devices poorly suited for use in these environments. The subject invention is particularly suited for use as gaskets, air filter seals and end caps, as well as covered gaskets. Common applications for such sealing devices include use on all types of motor driven vehicles, including, but not limited to, gas and diesel powered cars, trucks, and heavy equipment.

The composition according to the subject invention includes an isocyanate component for reaction with a resin component. The isocyanate component is present in an amount of from 20 to 35, preferably from 20 to 30, and more preferably from 22 to 30 parts by weight per 100 parts by weight of the resin component. In a preferred embodiment, the isocyanate component includes an isocyanate prepolymer and a MDI mixture. It is to be appreciated that those skilled in the art recognize that other isocyanate blends will work with the subject invention. The isocyanate prepolymer includes 4,4'-methylene diphenyl diisocyanate (MDI) and a polyol mixture. The 4,4'-MDI is present in an amount of from 70 to 95, preferably from 75 to 95, and more preferably 80 to 90, parts by weight based on 100 parts by weight of the isocyanate prepolymer. The polyol mixture is present in an amount of from 5 to 30, preferably from 5 to 25, and more preferably from 10 to 20, parts by weight based on 100 parts by weight of the isocyanate prepolymer. The polyol mixture may include dipropylene glycol and a propylene glycol initiated polyol. The dipropylene glycol is present in an amount of from 4 to 20 parts by weight and the propylene glycol initiated polyol is present in an amount of from 1 to 10 parts by weight, both based on 100 parts by weight of the isocyanate prepolymer.

Suitable propylene glycol initiated polyols for use in the isocyanate pre-polymer generally have a number-average molecular weight of between 200 to 1,000. The most preferred propylene glycol initiated polyol will have a number-average molecular weight of between 400 and 800. In addition, the propylene glycol initiated polyol may be characterized by its hydroxyl number. Suitable propylene glycol initiated polyols will have a hydroxyl number of between 56 and 560. Preferred propylene glycol initiated polyols will have a hydroxyl number of between 100 and 400 while the most preferred propylene glycol initiated polyol will have a hydroxyl number of between 140 and 280.

The MDI mixture includes MDI having a 2-ring content of from 35 to 50 parts by weight, a 3-ring content of from 15 to 25 parts by weight, and a n-ring oligomers of polymethylene polyphenyl polyisocyanate, wherein n is greater than 3, content of from 30 to 40 parts by weight, each based on 100 parts by weight of the mixture. The MDI mixture may include 2,4'-MDI and 4,4'-MDI, which may be provided by commonly available MDI. Suitable MDI's may be either pure, i.e. solely 4,4'-MDI, or mixtures containing both 4,4'-MDI and 2,4'-MDI isomers.

The 3-ring MDI and n-ring oligomers of polymethylene polyphenyl polyisocyanate (PMDI) will generally be obtained from a mixture of methylene diphenyl diisocyanate isomers, triisocyanates, and higher functional oligomers. As used wherein, the latter two terms are intended to describe 3-ring MDI oligomers and n-ring MDI oligomers, wherein n is greater than 3. Suitable PMDI isocyanates will generally contain a certain percentage of methylene diphenyl diisocyanate isomers with the remainder being the desired 3-ring and higher functional oligomers.

The isocyanate prepolymer is present in an amount of from 70 to 90, preferably form 75 to 85, and more preferably form 77 to 82, parts by weight based on 100 parts by weight of the isocyanate component. The MDI mixture is present in an amount of from 10 to 30, preferably from 15 to 25, more preferably form 18 to 23 parts by weight based on 100 parts by weight of the isocyanate component.

The resin component includes an isocyanate-reactive component, a graft dispersion, and a physical blowing agent. The composition is substantially free of chemically reactive blowing agents. It is to be appreciated that chemically reactive blowing agents will be referred to as chemical blowing agents below. By substantially free, it is meant that no additional chemical blowing agents are added, especially referring to water as a chemical blowing agent. However, it is to be appreciated that most chemicals include residual water that will act as the chemical blowing agent. Therefore, substantially free of water includes any residual water, or trace amounts, that is present in the individual components forming the composition and excludes adding additional chemical blowing agents. Chemical blowing agents result in the incorporation of short brittle segments in the polymer matrix, which are less forgiving to stress and detract from the overall physical properties of the sealing device. Properties such as compression set properties, flexibility, abrasion resistance, hardness, strength, and fatigue resistance appear to be particularly vulnerable. In addition, water blown polyurethane compositions appear to be inferior with respect to their ability to perform in a variety of processing latitudes, i.e. exhibit adequate flowability and/or demold times in molding operations.

The isocyanate-reactive component preferably has an actual functionality of at least four and a hydroxyl number of less than 40. In order to achieve the higher functionality of the isocyanate-reactive component, the isocyanate-reactive component is formed from an initiator selected from at least one of sucrose, glucose, sorbitol, mannitol, or dulcitol. Each of these initiators has a nominal functionality of at least four. It is to be appreciated that the following may also be used as the isocyanate-reactive component so long as the functionality is at least four and the hydroxyl number is less than 40. The isocyanate-reactive component may include polyhydroxyl-containing polyesters, polyoxyalkylene polyether polyols, polyhydroxy-terminated polyurethane polymers, polyhydroxyl-containing phosphorous compounds, and alkylene oxide adducts of polyhydric polythioesters, polyacetals, aliphatic polyols and thiols, as well as mixtures thereof. Alkylene oxide adducts of compounds which contain two or more different groups within the above-defined classes may also be used, for example, amino alcohols which contain amino groups and a hydroxyl group. Also, alkylene oxide adducts of compounds which contain one SH group and one OH group may be used.

Any suitable hydroxy-terminated polyester may be used as the isocyanate-reactive component such as are prepared, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, maleic acid, fumaric acid, glutaconic acid, α-hydromuconic acid, β-hydromuconic acid, α-butyl-α-ethyl-glutaric acid, α, β-diethylsuccinic acid, isophthalic acid, terephthalic acid, hemimellitic acid, and 1,4-cyclohexanedicarboxylic acid. Any suitable polyhydric alcohol, including both aliphatic and aromatic, may be used such as ethylene glycol, propylene glycol, trimethylene glycol, 1,2-butane diol, 1,3-butanediol, 1,4-butanediol, 1,2-pentanediol, 1,3-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, α-methyl glucoside, pentaerythritol, and sorbitol. Also included within the term "polyhydric alcohols" are compounds derived from phenol such as 2,2-bis(4-hydroxylphenyl)propane, commonly known as Bisphenol A. It is to be appreciated that mixtures of the above may be used as the isocyanate-reactive component so long as the actual functionality is at least 4.

Any suitable polyoxyalkylene polyether polyol may be used as the isocyanate-reactive component provided the functionality is greater than 4 such as the polymerization product of an alkylene oxide or a mixture of alkylene oxides with a polyhydric alcohol as an initiator. Examples of alkylene oxides include ethylene oxide, propylene oxide, butylene oxide, amylene oxide, and mixtures thereof, tetrahydrofuran, alkylene oxide-tetrahydrofuran mixtures, epihalohydrins, and aralkylene oxides such as styrene oxide. Suitable initiators include both aliphatic and aromatics alcohols, such as ethylene glycol, propylene glycol, dipropylene glycol, trimethylene glycol, 1,2-butanediol, 1,3-butanediol, 1,4-buanediol, 1,2-pentanediol, 1,3-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, α-methyl glucoside, pentaerythritol, sorbitol, and 2,2-bis(4-hydroxyphenyl)propane. Again, those skilled in the art may utilize mixtures of the above to produce the isocyanate-reactive component having an actual functionality of at least 4.

The polyoxyalkylene polyether polyols may have either secondary hydroxyl groups or a mixture of primary and secondary hydroxyl groups. If the latter, the mixture should have a majority of secondary hydroxyl groups. Included among the polyether polyols are polyoxyethylene glycol, polyoxypropylene glycol, polyoxypropylene glycerine, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-oxybutylene and polyoxyethylene glycols, and random copolymer glycols prepared from blends of two or more alkylene oxides or by the sequential addition of two or more alkylene oxides. The polyoxyalkylene polyether polyols may be prepared by any known process such as, for example, the process disclosed by Wurtz in 1859, Encyclopedia of Chemical Technology, Vol. 7, pp. 257-262, published by Interscience Publishers, Inc. (1951) or in U.S. Pat. No. 1,922,459.

To achieve the desired properties of the sealing device to withstand the increased temperatures, the isocyanate-reactive component is present in an amount of from 50 to 75, preferably from 55 to 70, and more preferably from 57 to 67, parts by weight based on 100 parts by weight of the resin component. Alkylene oxides which are preferred for reaction with the initiators are ethylene oxide and propylene oxide or mixtures thereof, which are reacted with the above initiators to make polyoxyalkylene polyether polyols having predominately polyoxypropylene groups with from 0 to 30 percent by weight polyoxyethylene groups as an end cap, a block, or heteric. More preferably, the isocyanate-reactive component has at least 15% terminal ethylene oxide groups. Those skilled in the art recognize that by "terminal ethylene oxide groups" indicates the isocyanate-reactive component has 15% by weight of ethylene oxide added at the end of formation of the isocyanate-reactive component based on 100% by weight the isocyanate-reactive component.

The subject invention further includes the incorporation of graft dispersions into the composition. Graft dispersions are well-known in the art and one method of preparing graft dispersions is by in situ polymerization of one or more vinyl monomers, preferably acrylonitrile and styrene, in the presence of a polyether or polyester polyol, especially polyols containing a minor amount of natural or induced unsaturation. This method forms the graft dispersion commonly referred to as polymer polyols, graft polyols, or graft polyol dispersions. Other graft dispersions that may be used with the subject invention include polyhamstoff dispersions' (PHD) polyols and polyisocyanate polyaddition (PIPA) polyols. PHD polyols are polyurea dispersions and PIPA polyols are polyurethane dispersions. Preferably, the graft dispersion has a solids content of from 15 to 45, preferably from 18 to 40, and more preferably from 20 to 33 parts by weight based on 100 parts by weight of the graft dispersion. Preferably, the graft dispersion has a hydroxyl number of from 18 to 32. Preferably the graft particles are made of 100% acrylonitrile encompassing 15-30% of the overall dispersion and carried by a TMP initiated polyol with similar characteristics to the isocyanate reactive polyol.

The physical blowing agent is preferably a chemically-inert, low boiling hydrocarbon, and more preferably a halogenated hydrocarbon. Those skilled in the art will recognize that other physical blowing may be used in accordance with the subject invention, so long as the physical blowing agent boils at a low temperature. It is to be appreciated that those skilled in the art will recognize that chemically-inert refers to reactivity of the blowing agent with the isocyanate and the isocyanate-reactive components. The physical blowing agent boils and does not chemically interact. The low boiling physical blowing agent may be selected from, but not limited to, at least one of pentafluoropropane, tetrafluoroethane, monochlorodifluoromethane, dichloromonofluoromethane, dichlorofluoromethane, propane, n-butane, isobutene, dimethylether, n-pentane, or cyclopentane. In the preferred embodiment, the physical blowing agent is 1,1,1,3,3-pentafluoropropane, commonly referred to as HFC-245 fa or R-245fa. The physical blowing agent is present in amount of from 0.01 to about 15, preferably from 0.01 to 10, and more preferably from 1 to 8, parts by weight based on 100 parts by weight of the resin component.

The subject invention may further comprise a chain extender to improve the physical properties of the polyurethane foam sealing device. Chain extenders which may be employed include those compounds having two functional groups bearing active hydrogen atoms such as primary and secondary hydroxy acids, glycols, diols, and hydroxy adducts of naturally occurring oils such as soy or palm, or mixtures thereof. Such agents will generally have a number average molecular weight of less than about 400. A preferred group of chain-extending agents includes ethylene glycol, 1,4-butanediol, diethylene glycol, and mixtures thereof. Those skilled in the art will appreciate that some of the compounds discussed above as chain extenders may act as catalysts or as additives. Preferably, the chain extender has at least two hydroxyl groups and a backbone chain with from 2 to 10 carbon atoms. The chain extender is preferably present in an amount of from 0.01 to about 10, preferably form 0.01 to 8, and more preferably from 1 to 7, parts by weight based on 100 parts by weight of the resin component.

In addition to the above, the subject invention may optionally contain one or more additives selected from at least one of surface active agents, catalysts, stabilizers, dyes, fillers, pigments, flame inhibitors, antioxidants, plasticizers, and the like, as well as mixtures thereof.

Any suitable catalyst may be used, including tertiary amines such as, for example, triethylenediamine, N-methylmorpholine, N-ethylmorpholine, diethylethanolamine, N-cocomorpholine, 1-methyl-4-dimethylaminoethylpiperazine, 3-methoxypropyldimethylamine, N,N,N'-trimethylisopropyl propylenediamine, 3-diethylaminopropyldiethylamine, dimethylbenzylamine, and the like. Other suitable catalysts are, for example, stannous chloride, dibutyltin di-2-ethyl hexanoate, stannous oxide, as well as other organometallic compounds.

A surfactant or surface-active agent may be necessary for the production of high grade polyurethane foam and articles. Numerous surface-active agents have been found to be satisfactory. Nonionic surface-active agents are preferred. Of these, the nonionic surface-active agents such as the well-known silicones have been found particularly desirable. Other surface-active agents which are operative, include paraffin oils, castor oil, turkey red oil, polyethylene glycol ethers of long chain alcohols, tertiary amine or alkanolamine salts of long chain alkyl acid sulfate esters, alkyl sulfonic esters, and alkyl arylsulfonic acids.

Among the flame retardants which may be employed are pentabromodiphenyl oxide, dibromopropanol, tris(β-chloropropyl)phosphate, 2,2-bis(bromoethyl) 1,3-propanediol, tetrakis(2-chloroethyl)ethylene diphosphate, tris(2,3-dibromopropyl)phosphate, tris(β-chloroethyl)phosphate, tris(1,2-dichloropropyl)phosphate, bis-(2-chloroethyl) 2-chloroethylphosphonate, molybdenum trioxide, ammonium molybdate, ammonium phosphate, pentabromodiphenyloxide, tricresyl phosphate, hexabromocyclododecane, melamine, antimony pentoxide, and dibromoethyl-dibromocyclohexane antimony trioxide.

Preferred pigments and/or dyes include carbon black and dispersions of the same in resin and/or solvent.

The subject invention further provides a process for forming the sealing device. The process includes the steps of providing the isocyanate component, providing the resin component, and reacting the isocyanate component with the resin component substantially free of chemical blowing agents to form the sealing device. As discussed above, the resin component includes the isocyanate-reactive component having the functionality of at least four and a hydroxyl number of less than 40, the graft dispersion, chain extenders and a non-reactive physical blowing agent.

The process of making the isocyanate component includes the formation of the isocyanate prepolymer and the mixing of the isocyanate prepolymer with the MDI mixture. The 4,4'-methylene diphenyl diisocyanate is reacted with the polyol mixture to form the isocyanate prepolymer. In general, the liquid ingredients of 4,4'-methylene diphenyl diisocyanate will be preferably charged to a reactor which is heated to a temperature sufficient to make any solid MDI based components molten or liquid. Subsequently, a sufficient amount of the polyol mixture is added to the heated reactor. The reactor contents will be subsequently heated to a temperature of between 77° F. and 212° F. More preferably, the reaction will take place at temperatures between 122° F. to 176° F.

The isocyanate prepolymer is then mixed with the MDI mixture to form the isocyanate component. In general, the isocyanate component will be added to the resin component comprised of the isocyanate-reactive component, graft polyol dispersion, the chain-extender, and the physical blowing agent. Other additives may be added and may be selected from at least one of surfactants, catalysts, stabilizers, dyes, fillers, pigments, flame inhibitors, and anti-oxidants.

The isocyanate component and the resin component may be mixed at tank temperatures from 59° F. to 194° F., preferably at tank temperatures from 68° F. to 95° F., and may be poured or sprayed into an open mold which is subsequently optionally closed, or may be injected using high or low pressure multi-component dispensing equipment into an open or closed mold. The mixing can be performed mechanically by means of a stirrer or under high pressure by the impingement method. The mold temperature should be from about 68° F. to 140° F., preferably 86° F. to 140° F. The resultant polyurethane foam is primarily intended for use in the sealing device market but other possible applications include use as head rests, spoilers, bumpers and seating applications in the automotive field as well as non-automotive uses such as shoe soles.

As indicated above, performance properties indicating strength, hardness and compression characteristics are particularly important in the characterization of sealing devices. It has been found that in order for the sealing devices to perform optimally, they must possess particular values for the physical parameters indicative of strength, hardness and compression characteristics.

In particular, it has been found that molded polyurethane foams intended for use as sealing devices should generally possess a compression set of less than 15% at 240° F. for 24 hours and less than 18% at 250° F. for 24 hours. More specifically, non-heat aged sealing devices left at room temperature prior to testing have a compression set of less than 15% at 240° F. for 24 hours and less than 18% at 250° F. for 24 hours. Heat aged sealing devices (149° F. for 72 hours) have a compression set of less than 10% at 240° F. for 24 hours and has a compression set of less than 15% at 250° F. for 24 hours. The compression set is determined on a sample having dimensions of 1"×1"×0.5" that is removed from the molded article. The initial thickness of the sample is then measured and recorded. The sample is placed between two parallel plates and compressed to 0.25". The apparatus is placed in the oven at a given temperature for a given period of time. Once the time is up, the samples are immediately removed from the apparatus and allowed to cool for 30 minutes before the final thickness is measured and recorded.

In general, the polyurethane foam sealing devices should have a uniform skin and be free of surface irregularities and tears on the mold surface side. It should be relatively free of surface pinholes and voids. In addition, the polyurethane foam sealing device should be capable of adhering to metal and/or plastic substrates.

The following examples illustrate the formation of the polyurethane foam sealing device, according to the subject invention and illustrating certain properties of the polyurethane foam sealing device, as presented herein, are intended to illustrate and not limit the invention.

EXAMPLES

A polyurethane foam sealing device was prepared according to the composition illustrated in Table 1. The components that form the composition are listed in parts by weight, unless otherwise indicated.

TABLE 1

Formulation of Polyurethane Foam Sealing Device

| Component | Example 1 | Example 2 | Example 3 | Example 4 | Comparative Example 1 |
|---|---|---|---|---|---|
| Isocyanate-reactive Component A | 61.90 | — | — | — | 62.74 |
| Isocyanate-reactive Component B | — | 61.90 | 63.00 | 61.90 | — |
| Graft Dispersion A | 26.50 | 26.50 | 26.80 | — | 27.43 |
| Graft Dispersion B | — | — | — | 26.50 | — |
| Chain Extender A | 4.60 | 4.60 | — | 4.60 | 4.47 |
| Chain Extender B | — | — | 3.20 | — | — |
| Catalyst | 0.50 | 0.50 | 0.50 | 0.50 | 0.78 |
| Pigment | 1.50 | 1.50 | 1.50 | 1.50 | 1.46 |
| Physical Blowing Agent | 5.00 | 5.00 | 5.00 | 5.00 | 3.00 |
| Chemical Blowing Agent | — | — | — | — | 0.19 |
| Isocyanate Component | 27.31 | 27.31 | 27.62 | 26.98 | 30.54 |

Isocyanate-reactive component A is a polyol formed from a pentaerythritol initiator and has a calculated functionality of about 3.3, a hydroxyl number of about 35.2, and a weight-average molecular weight of about 1590. Isocyanate-reactive component A is all PO with 15% EO capping. Isocyanate-reactive component B is a polyol formed from a sorbitol initiator and has a calculated functionality of about 5.5, a hydroxyl number of about 38.1, and a weight-average molecular weight of about 1590. Isocyanate-reactive component B is all PO with 21% EO capping.

Graft dispersion A is a graft polymer polyol having all polyacrylonitrile grafted to ethylene oxide end capped polypropylene glycol polyether triols. Graft dispersion A has a functionality of greater than 2, a solids content of about 20%, and is commercially available from Bayer Polymer as ARCOL® 31-28. Graft Dispersion B is a graft polymer polyol having acrylonitrile/styrene (1:1 weight ratio) grafted to a TMP initiated polyol having 84% PO and 13% EO. Graft dispersion B ha a functionality of about 2.57, a solids content of about 30%, a hydroxyl number of 24.5, and is commercially available from BASF Corporation as PLURACOL® 1198.

Chain extender A is 1,4-butanediol and chain extender B is ethylene glycol. The catalyst is an amine catalyst and suitable amine catalysts include Dabco® 33LV and Polycat® 77, both commercially available from Air Products & Chemical Co. The pigment is a standard black pigment. The physical blowing agent is 1,1,1,3,3-pentafluoropropane, commonly referred to as HFC-245 fa. The chemical blowing agent n the Comparative Examples is water.

The isocyanate component is an 80/20 parts by weight mixture of an isocyanate prepolymer and a MDI mixture, respectively. The prepolymer has about 86.9 parts by weight 4,4'-methylene diphenyl diisocyanate, 8.2 parts by weight of dipropylene glycol, and 4.9 parts by weight a propylene glycol initiated polyol having a OH# of 260 and number-average molecular weight of 430. The prepolymer is commercially available from BASF Corporation as LUPRANATE® MP102. The MDI mixtures comprises 3.1 parts by weight of 2,4'-MDI, 39.6 parts by weight of 4,4'-MDI, 20.5 parts by weight 3-ring MDI, and 36.8 parts by weight of n-ring oligomers of polymethylene polyphenyl polyisocyanate, where n is greater than 3. The MDI mixture is commercial available from BASF Corporation as ELASTOFLEX® R23000T.

The polyurethane foam sealing device was prepared and cut into samples measuring 1" by 1" by ½". The samples were then subjected to an amount of force sufficient to compress the samples to about 50% of the height, or about 0.25". The compression set procedures are described more fully above. Table 2 below lists the compression set properties for the polyurethane foam sealing devices formed according to Table 1.

TABLE 2

Compression set properties

| Property | Example 1 | Example 2 | Example 3 | Example 4 | Comparative Example 1 |
|---|---|---|---|---|---|
| Compression Set - Non-Heat Aged | | | | | |
| 24 hours @ 240° F. | 12.23% | 5.24% | 7.13% | 10.53% | 32.35% |
| 24 hours @ 250° F. | 71.35% | 15.37% | 22.44% | 45.95% | N/A |
| Compression Set - Heat Aged | | | | | |
| 24 hours @ 240° F. | 9.00% | 4.30% | 6.41% | 9.35% | N/A |
| 24 hours @ 250° F. | 71.37% | 11.71% | 13.89% | 15.52% | N/A |

Each of the Examples 1-4 produced the sealing device having a compression set of less than 15% at 24 hours for 240° F., whether the sample was heat aged or not heat aged. However, only Example 2, non-heat aged and for 24 hours and Examples 2-4, heat aged, for 24 hours produced the sealing device having a compression set less than 18% for 250° F. It is believed that Example 2, non-heat aged, achieves the desired compression set as a result of the specific isocyanate-reactive component, the graft dispersion, and the chain extender. It is believed that the difference in isocyanate-reactive components between Example 1 and Examples 2-4 causes the satisfactory results for the heat aged samples since the isocyanate-reactive component B has a higher functionality than the isocyanate-reactive component A. As can be seen from these results, it has surprisingly been discovered that these compositions produce the heat aged sealing devices having improved compression set values relative to the non-heat aged compression set values.

Comparative Example 1 incorporates additional water as the chemical blowing agent, in addition the residual water, plus a physical blowing agent. From Table 2, Comparative Example 1 has a compression set value for 24 hours at 240° F. of about 32.35%. Examples 1-4 have a much lower compression set relative to Comparative Example 1, which is believed to be as a result of the chemically reactive blowing agent used in Comparative Example 1. Higher temperatures were not tested since the compression set was unacceptable at the lower temperature. One skilled in the art would recognize that the compression set values would continue to worsen as the temperature was increased.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A sealing device comprising the reaction product of:
   an isocyanate component; and
   a resin component comprising;
      an isocyanate-reactive component present in an amount of from 50 to 75 parts by weight based on 100 parts by weight of said resin component and formed from an initiator selected from at least one of sucrose, glucose, sorbitol, mannitol, or dulcitol such that said isocyanate-reactive component has a functionality of at least four and said isocyanate-reactive component having a hydroxyl number of less than 40,
      a graft dispersion, and
      a physical blowing agent present in amount of from 0.01 to about 15 parts by weight based on 100 parts by weight of said resin component; and
   wherein said composition is substantially free of chemical blowing agents; and
   wherein said sealing device has a compression set of less than 18% at 250° F. for 24 hours.

2. A sealing device as set forth in claim 1 wherein said sealing device has a compression set of less than 15% at 240° F. for 24 hours.

3. A sealing device as set forth in claim 1 wherein said physical blowing agent is selected from at least one of pentafluoropropane, tetrafluoroethane, monochlorodifluoromethane, dichloromonofluoromethane, dichlorofluoromethane, propane, n-butane, isobutene, dimethylether, n-pentane, or cyclopentane.

4. A sealing device as set forth in claim 1 wherein said graft dispersion is present in an amount of from 15 to 45 parts by weight based on 100 parts by weight of said resin component.

5. A sealing device as set forth in claim 1 wherein said isocyanate component is present in an amount of from 20 to 35 parts by weight per 100 parts by weight of said resin component.

6. A sealing device as set forth in claim 1 wherein said isocyanate component comprises a isocyanate prepolymer in an amount of from 70 to 90 parts by weight and a MDI mixture in an amount of from 10 to 30 parts by weight, both based on 100 parts by weight of said isocyanate component.

7. A sealing device as set forth in claim 6 wherein said isocyanate prepolymer comprises 4,4'-methylene diphenyl diisocyanate in an amount of from 70 to 95 parts by weight and a polyol mixture in an amount of from 5 to 30 parts by weight, both based on 100 parts by weight of said isocyanate prepolymer.

8. A sealing device as set forth in claim 7 wherein said polyol mixture comprises dipropylene glycol in an amount of from 4 to 20 parts by weight and a propylene glycol initiated polyol in an amount of from 1 to 10 parts by weight, both based on 100 parts by weight of said isocyanate prepolymer.

9. A sealing device as set forth in claim 6 wherein said MDI mixture comprises methylene diphenyl diisocyanate having a 2-ring content of from 35 to 40 parts by weight, a 3-ring content of from 15 to 25 parts by weight, and a n-ring oligomers of polymethylene polyphenyl polyisocyanate wherein n is greater than 3 content of from 30 to 40 parts by weight, each based on 100 parts by weight of said mixture.

10. A process for forming a sealing device, said process comprising the steps of:
providing an isocyanate component;
providing a resin component, wherein the resin component comprises an isocyanate-reactive component present in an amount of from 50 to 75 parts by weight based on 100 parts by weight of the resin component and formed from an initiator selected from at least one of sucrose, glucose, sorbitol, mannitol, or dulcitol such that the isocyanate-reactive component has a functionality of at least four and the isocyanate-reactive component having a hydroxyl number of less than 40, a graft dispersion, and a physical blowing agent present in amount of from 0.01 to about 15 parts by weight based on 100 parts by weight of the resin component; and
reacting the isocyanate component with the resin component substantially free of chemical blowing agents to form the sealing device having a compression set of less than 18% at 250° F. for 24 hours.

11. A process as set forth in claim 10 wherein the physical blowing agent is selected from at least one of pentafluoropropane, tetrafluoroethane, monochlorodifluoromethane, dichloromonofluoromethane, dichlorofluoromethane, propane, n-butane, isobutene, dimethylether, n-pentane, or cyclopentane.

12. A process as set forth in claim 10 wherein the graft dispersion is present in an amount of from 15 to 45 parts by weight based on 100 parts by weight of the resin component.

13. A process as set forth in claim 10 wherein the isocyanate component is present in an amount of from 20 to 35 parts by weight per 100 parts by weight of the resin component.

14. A process as set forth in claim 10 wherein the isocyanate component comprises a isocyanate prepolymer in an amount of from 70 to 90 parts by weight and a MDI mixture in an amount of from 10 to 30 parts by weight, both based on 100 parts by weight of the isocyanate component.

15. A process as set forth in claim 14 wherein the isocyanate prepolymer comprises 4,4'-methylene diphenyl diisocyanate in an amount of from 70 to 95 parts by weight and a polyol mixture in an amount of from 5 to 30 parts by weight, both based on 100 parts by weight of the isocyanate prepolymer.

16. A process as set forth in claim 15 wherein the polyol mixture comprises dipropylene glycol in an amount of from 4 to 20 parts by weight and a propylene glycol initiated polyol in an amount of from 1 to 10 parts by weight, both based on 100 parts by weight of the isocyanate prepolymer.

17. A process as set forth in claim 14 wherein the MDI mixture comprises methylene diphenyl diisocyanate having a 2-ring content of from 35 to 40 parts by weight, a 3-ring content of from 15 to 25 parts by weight, and a n-ring oligomers of polymethylene polyphenyl polyisocyanate wherein n is greater than 3 content of from 30 to 40 parts by weight, each based on 100 parts by weight of the MDI mixture.

* * * * *